(12) United States Patent
Schwartz

(10) Patent No.: US 9,482,415 B1
(45) Date of Patent: Nov. 1, 2016

(54) SUBMERSIBLE FLOATING LIGHT

(71) Applicant: Jack A. Schwartz, Cape Coral, FL (US)

(72) Inventor: Jack A. Schwartz, Cape Coral, FL (US)

(*) Notice: Subject to any disclaimer, the term of this patent is extended or adjusted under 35 U.S.C. 154(b) by 0 days.

(21) Appl. No.: 14/043,671

(22) Filed: Oct. 1, 2013

Related U.S. Application Data

(60) Provisional application No. 61/714,935, filed on Oct. 17, 2012.

(51) Int. Cl.
| | |
|---|---|
| F21V 21/02 | (2006.01) |
| F21V 21/088 | (2006.01) |
| F21S 8/00 | (2006.01) |
| F21W 111/04 | (2006.01) |

(52) U.S. Cl.
CPC ............. *F21V 21/088* (2013.01); *F21S 8/00* (2013.01); *F21S 8/032* (2013.01); *F21W 2111/04* (2013.01)

(58) Field of Classification Search
CPC .............. F21S 8/032; F21S 8/00; F21W 2111/043–2111/047; A01K 63/06
USPC ......... 362/95, 154, 158, 267, 362; 294/66.2, 294/66.1
See application file for complete search history.

(56) References Cited

U.S. PATENT DOCUMENTS

| | | | | |
|---|---|---|---|---|
| 2,765,481 | A * | 10/1956 | Manhart et al. | 362/158 |
| 3,836,762 | A * | 9/1974 | Thomason | 362/186 |
| 5,105,346 | A * | 4/1992 | Acks et al. | 362/267 |
| 6,220,718 | B1 * | 4/2001 | Burgess | 362/101 |
| 6,315,429 | B1 * | 11/2001 | Grandolfo | A01K 63/06 |
| | | | | 362/158 |
| 7,008,081 | B2 * | 3/2006 | Lunt | 362/267 |
| 7,762,685 | B1 * | 7/2010 | Beucler | 362/267 |
| 2002/0178641 | A1 * | 12/2002 | Kent | 43/17.5 |

* cited by examiner

*Primary Examiner* — Mariceli Santiago
(74) *Attorney, Agent, or Firm* — Livingston Loeffler, P.A.; Edward M. Livingston, Esq.; Bryan L. Loeffler, Esq.

(57) ABSTRACT

A submersible floating light (1) having a bulb that (3) that floats under that surface of a body of water, thereby illuminating the water and attracting fish and other aquatic life at night. A weighted base (8) locks onto an electrical power cord (7) that passes through apertures (15, 16) located on a housing (9) of the weighted base. The electrical power cord extends from an electrical power source through the weighted base and to the bulb. Clamps (17) allow the weighted base to be positioned at a predetermined distance from the bulb on the electrical power cord.

14 Claims, 3 Drawing Sheets

SUBMERSIBLE FLOATING LIGHT

CROSS-REFERENCE TO RELATED APPLICATIONS

This application claims priority to application No. 61/714,935, filed on Oct. 17, 2012. The patent application identified above is incorporated herein by reference in its entirety to provide continuity of disclosure.

FIELD OF THE INVENTION

This invention relates to submersible lights used for illuminating water to attract fish and other aquatic wildlife and more particularly a submersible light have a weighted base that allows an individual to easily adjust the position of the light in a body of water in relation to the surface of the body of water.

BACKGROUND OF THE INVENTION

Submersible lights are used to illuminate a body of water, such as a lake, pond, canal and so forth, to attract fish and other aquatic wildlife for fishing and/or for aesthetic pleasure. Conventional permanent underwater lights are normally mounted to a boat or dock. However, there are also portable or free standing submersible lights that are held in place by a power cord and a weight. A problem with such conventional free standing submersible lights is perfecting the placement of the light in the water, and more specifically adjusting the height of a bulb portion of the submersible light in relation to the surface of the water and the water floor. This is normally accomplished by estimating the required length of power cord to place the bulb portion under the surface of the water and then attaching a weight to the power cord at the estimated distance from the bulb portion. The weight is currently attached by tying the weight to the cord.

However, this conventional method can cause three problems. The first problem is that if the estimated length of cord is incorrect, then the weight must be pulled out of the water and reattached to the power cord which can cause installation of the submersible light to be time consuming. The second problem is that the electrical power cord can become loosened from the weight thereby causing the submersible light to float to the surface of the water and requiring that the weight be more firmly attached to the electrical power cord. The third problem is that the weight can become completely detached from the electrical power cord, thereby requiring that an individual to dive into the water to retrieve the weight or face a complete loss of the weight.

Therefore, a need exists for a submersible floating light having a weighted base that securely clamps onto a power cord and allows an individual to easily adjust the length of electrical power cord between the weighted base and a bulb portion of the submersible light.

SUMMARY OF THE INVENTION

The primary object of the present invention is to provide a submersible floating light having a weighted base that securely clamps onto and attaches to a power cord.

A further object of the present invention is to provide a submersible floating light having a weighted base that allows an individual to easily adjust the length of power cord between the weighted base and a bulb portion of the submersible light.

The present invention fulfills the above and other objects by providing a submersible floating light having a bulb portion, a weighted base and a power source. The bulb portion has a bulb, such as a metal halide lamp, LED or other light source, that is buoyant and capable of floating in water. The bulb portion also has a socket that holds the bulb.

The bulb portion is then connected to a power source via an electrical power cord. The electrical power cord may be hard wired to the electrical power source or connected to the electrical power source via an electrical plug, which is preferably a ground-fault circuit interrupter ("GFCI") electrical plug to prevent electrical shocks from occurring from the submersible floating light. A junction box may be connected to the electrical power cord proximal to the electrical plug to provide storage for an electrical transformer, a capacitor, a power switch, a photolytic cell and so forth.

A weighted base having a housing with an upper surface, a lower surface, at least one side surface and an interior portion is located between the electrical plug and the bulb portion of the submersible floating light. The electrical power cord extends from the electrical plug to the junction box and then through the weighted base and terminates at the bulb portion. The electrical power cord passes through a first aperture preferably located on the at least one side surface of the weighted base, passes through the interior portion of the weighted base and then passes out of the weighted base through a second aperture that is preferably located on the upper surface of the weighted base. By passing the electrical power cord through the at least one side surface and then through the upper surface, the electrical power cable between the weighted housing and the bulb portion will be substantially straight, thereby causing the bulb to be in an upright position in the water. Clamps, such as cord grip connectors, are located at the first aperture and/or the second aperture to grip the electrical power cord and lock the weighted base in place at predetermined position on the electrical power cord. At least one weight is located within the housing to keep the weighted base in place on the water floor.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
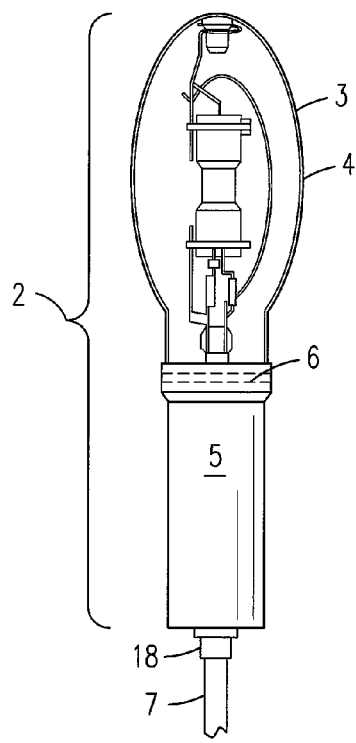
FIG. 1 is a side plan view of a bulb portion of a submersible floating light of the present invention.

For purposes of describing the preferred embodiment, the terminology used in reference to the numbered components in the drawings is as follows:

1. submersible floating light, generally
2. bulb portion
3. bulb
4. metal halide lamp
5. socket
6. sealing means
7. electrical power cord
8. weighted base
9. housing
10. upper surface of housing
11. lower surface of housing
12. side surface of housing
13. interior portion of housing
14. electrical plug
15. first aperture
16. second aperture
17. clamp
18. cord grip connector
19. weight
20. concrete
21. bore
22. junction box
23. rear panel of junction box
24. side of junction box
25. cover of junction box
26. transformer
27. capacitor
28. power switch
29. photolytic cell
30. vent
31. bottom surface of junction box
32. nut of the cord grip connector
33. body member of the cord grip connector
34. grommet of the cord grip connector With reference to FIG. 1, a side plan view of a bulb portion 2 of a submersible floating light 1 of the present invention is illustrated. The bulb portion 2 comprises a bulb 3, such as a metal halide lamp 4, LED or other light source, that is buoyant and capable of floating in water. The bulb portion 2 further comprises a socket 5 that holds the bulb 3. A sealing means 6, such as rubber, silicone, epoxy and so forth is located between the socket 5 and the bulb 3 to waterproof the sockets and to prevent water from entering a space located between the socket 5 and the bulb 3. An electrical power cord 7 extends from the socket 5 and connects the bulb portion 2 to the other components of the submersible floating light 1 as described hereafter. A cord grip connector 18 may be located on the socket 5 to clamp the electrical power cord 7 and to provide a water tight seal.

Figure 2:
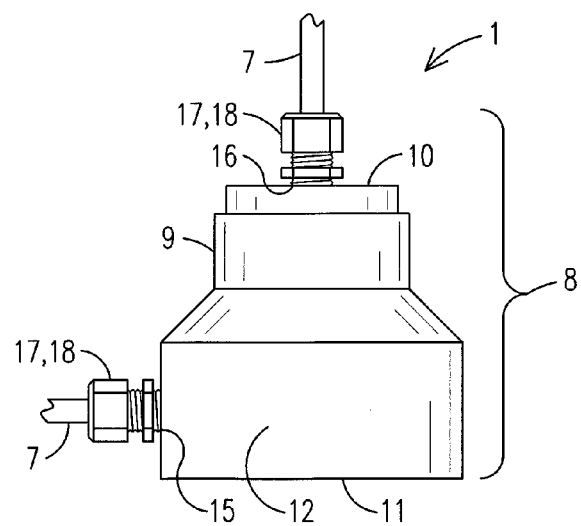
FIG. 2 is a side view of a weighted base of a submersible floating light of the present invention.
Figure 3:
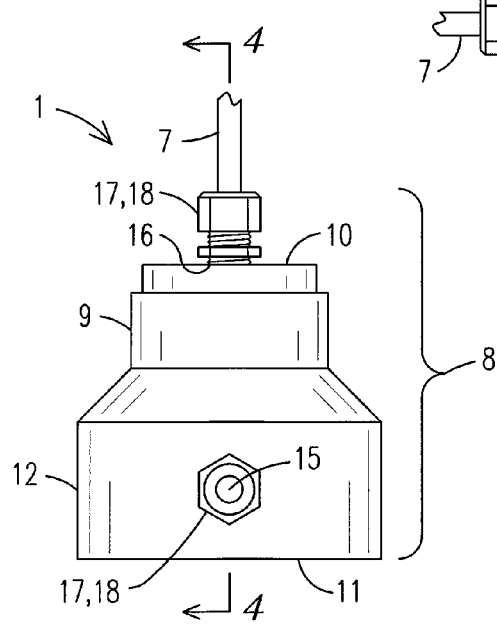
FIG. 3 is an alternate side view of a weighted base of a submersible floating light of the present invention.
Figure 4:
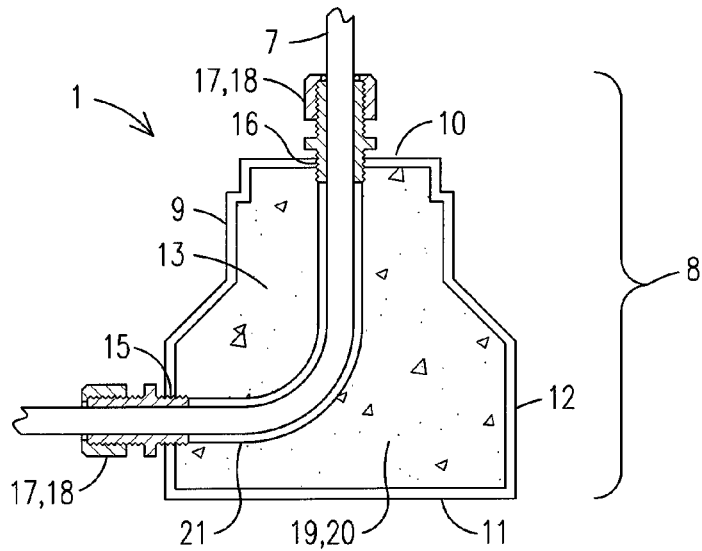
FIG. 4 is a cross-sectional view along line 4-4 of FIG. 3 of a weighted base of a submersible floating light of the present invention.
Figure 5:
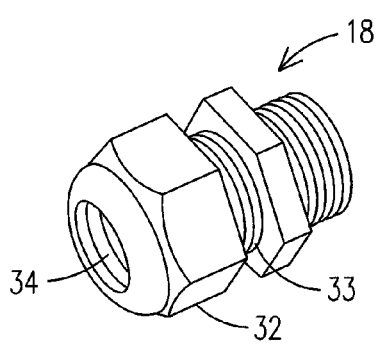
FIG. 5 is a perspective view of a cord grip connector of a weighted base of a submersible floating light of the present invention.

With reference to FIGS. 2, 3 and 4, a side view, an alternate side view and a cross-sectional view along line 4-4 of FIG. 3, respectively, of a weighted base 8 of a submersible floating light 1 of the present invention are illustrated. The weighted base 8 comprises a housing 9 with an upper surface 10, a lower surface 11, at least one side surface 12 and an interior portion 13. The weighted base 8 is located between an electrical plug 14 and the bulb portion 2 of the submersible floating light 1, as illustrated in FIG. 10. The electrical power cord 7 extends through the weighted base 8 through a first aperture 15, preferably located on the at least one side surface 12 of the housing 9, then through the interior portion 13 of the weighted base 8, and then passes out of the housing 9 through a second aperture 16 that is preferably located on the upper surface 10 of the housing 9. Clamps 17, such as cord grip connectors 18 (as illustrated in FIG. 5), are located at the first aperture 15 and/or the second aperture 16 to grip the electrical power cord 7, thereby locking the weighted base 8 in place at predetermined position on the electrical power cord 7. At least one weight 19, such as concrete, lead and so forth, is located within the housing 9 to keep the weighted base 8 in place on the water floor. As illustrated in FIG. 4, the weight 19 is concrete 20 that fills the inner portion 13 of the housing 9 and has a bore 21 from the first aperture 15 to the second aperture 16 to allow a space for the electrical power cord 7 to pass through.

With reference to FIG. 5, a perspective view of a cord grip connector 18 of a weighted base 8 of a submersible floating light 1 of the present invention is illustrated. Tightening a nut 32 onto a body member 33 of the cord grip connector 18 results in radial forces between a grommet 34 and the electrical power cord 7 to restrain the electrical power cord 7 and provide a water tight seal.

Figure 6:
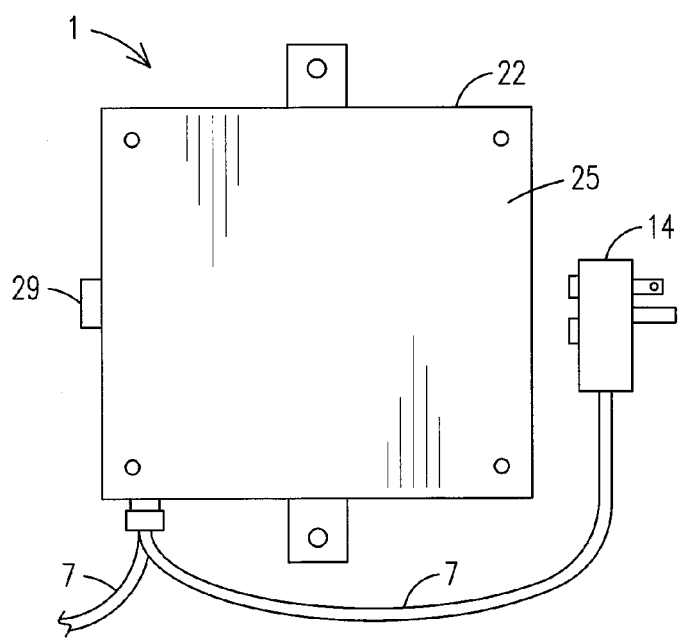
FIG. 6 is a front view of a junction box of a submersible floating light of the present invention.
Figure 7:
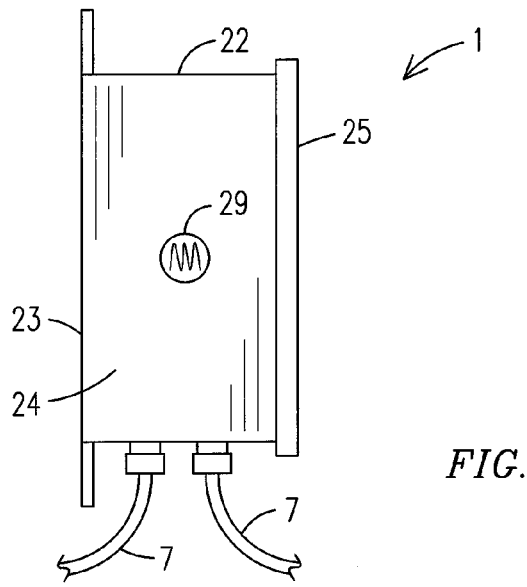
FIG. 7 is a side view of a junction box of a submersible floating light of the present invention.
Figure 8:
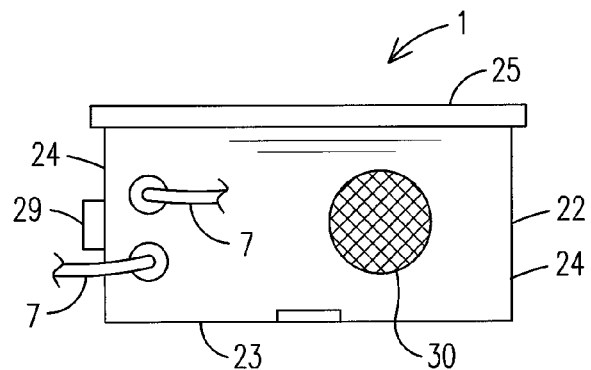
FIG. 8 is a bottom view of a junction box of a submersible floating light of the present invention.
Figure 9:
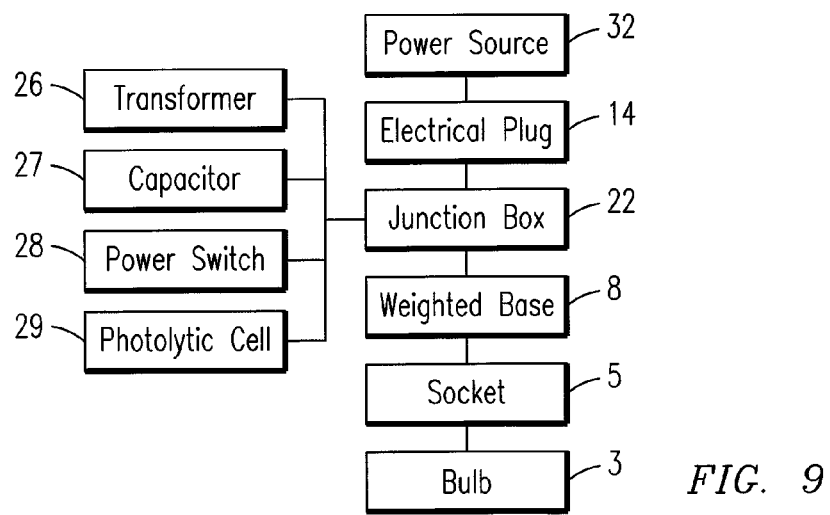
FIG. 9 is a box diagram showing the various components of a submersible floating light of the present invention.

With reference to FIGS. 6, 7 and 8, a front view, a side view and a bottom view, respectively, of a junction box 22 of a submersible floating light 1 of the present invention are illustrated. The junction box 22 comprises a rear panel 23 sides 24 and a removable cover 25. The electrical power cord may be hard wired to an electrical power source or connected to the electrical power source via an electrical plug 14 (as illustrated in FIG. 6), which is preferably a ground-fault circuit interrupter ("GFCI") electrical plug to prevent electrical shocks from occurring from the submersible floating light 1. The junction box 22 may be connected to the electrical power cord 7 proximal to the electrical plug 14 to provide storage for an electrical transformer 26 (as illustrated in FIG. 9), a capacitor 27 (as illustrated in FIG. 9), a power switch 28 (as illustrated in FIG. 9), a photolytic cell 29 and so forth. The photolytic cell 29 may be used to activate and deactivate the submersible floating light 1 according to ambient lighting conditions. A vent 30 is located on a bottom surface 31 of the junction box 22 to provide air circulation to the junction box 22. With reference to FIG. 9, a box diagram showing the various components of a submersible floating light of the present invention is illustrated. The junction box 22 may be proximal to the electrical plug 14, which is connected to a power source 32. The junction box 22 may comprise an electrical transformer 26, a capacitor 27, a power switch 28, a photolytic cell 29 and so forth. All of the components are connected by one or more electrical power cords 7. The weighted base 8 is located between the junction box 22 and the socket 5, which is connected directly to the bulb 3.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A submersible floating light comprising:
a bulb portion having a bulb that is buoyant and capable of floating in water;
said bulb connected to a socket that holds the bulb;
an electrical power cord extending from the socket to an electrical power source;
a weighted base secured to the electrical power cord between the socket and the electrical power source; and
said weighted base further comprises a housing having an upper surface, a lower surface, at least one side surface and an interior portion, wherein said electrical power cord extends from the electrical power source then through a first aperture located on the at least one side surface of the housing of the weighted base, then through the interior portion of the housing of the weighted base and then exits the housing of the weighted base through a second aperture;
said second aperture is located on the upper surface of the housing of the weighted base so the electrical cord extends upward exiting said second aperture and extending a predetermined distance above the upper surface of the housing to the bulb portion in a substantially straight line, thereby allowing the bulb portion to float freely in water while being connected to the housing by the electrical cord.

2. The submersible floating light of claim 1 further comprising:
a clamp located proximal to the first aperture on the housing of the weighted base that locks the weighted base in a desired position on the electrical cord.

3. The submersible floating light of claim 1 further comprising:
a clamp located proximal to the second aperture on the housing of the weighted base that locks the weighted base in a desired position on the electrical cord.

4. The submersible floating light of claim 1 further comprising:
at least one weight located within the housing of the weighted base.

5. The submersible floating light of claim 4 further comprising:
a bore extending through the at least one weight from the first aperture to the second aperture; and
said electrical cord extends through the bore.

6. A submersible floating light comprising:
a bulb portion having a bulb that is buoyant and capable of floating in water;
said bulb connected to a socket that holds the bulb;
an electrical power cord extending from the socket to an electrical power source;
a weighted base secured to the electrical power cord between the socket and the electrical power source;
said weighted base having a housing with an upper surface, a lower surface, at least one side surface and an interior portion, wherein said electrical power cord extends from the electrical power source then through a first aperture located on the at least one side surface of the housing of the weighted base, then through the interior portion of the housing of the weighted base and then exits the housing of the weighted base through a second aperture;
said second aperture is located on the upper surface of the housing of the weighted base so the electrical cord extends upward exiting said second aperture and extending a predetermined distance above the upper surface of the housing to the bulb portion in a substantially straight line, thereby allowing the bulb portion to float freely in water while being connected to the housing by the electrical cord;
a bore extending through the interior portion of the housing from the first aperture and curving upward to the second aperture; and
said electrical power cord extends through the bore.

7. The submersible floating light of claim 6 further comprising:
a clamp located proximal to the first aperture on the housing of the weighted base that locks the weighted base in a desired position on the electrical cord.

8. The submersible floating light of claim 6 further comprising:
a clamp located proximal to the second aperture on the housing of the weighted base that locks the weighted base in a desired position on the electrical cord.

9. The submersible floating light of claim 6 further comprising:
at least one weight located within the housing of the weighted base.

10. The submersible floating light of claim 9 further comprising:
said bore extending through the at least one weight from the first aperture to the second aperture.

11. A submersible floating light comprising:
a bulb portion having a bulb that is buoyant and capable of floating in water;
said bulb connected to a socket that holds the bulb;
an electrical power cord extending from the socket to an electrical power source;
a weighted base secured to the electrical power cord between the socket and the electrical power source;
said weighted base having a housing with an upper surface, a lower surface, at least one side surface and an interior portion;
said electrical power cord extends from the electrical power source then through a first aperture located on the at least one side surface of the housing of the weighted base, then through the interior portion of the housing of the weighted base and then exits the housing of the weighted base through a second aperture;
said second aperture is located on the upper surface of the housing of the weighted base so the electrical cord extends upward exiting said second aperture and extending a predetermined distance above the upper surface of the housing to the bulb portion in a substantially straight line, thereby allowing the bulb portion to float freely in water while being connected to the housing by the electrical cord; and
a clamp located on the housing of the weighted base that locks the weighted base in a desired position on the electrical cord.

12. The submersible floating light of claim 11 further comprising:
at least one weight located within the housing of the weighted base.

13. The submersible floating light of claim 11 further comprising:
a bore extending through the at least one weight from the first aperture to the second aperture, wherein said electrical cord extends through the bore.

14. The submersible floating light of claim 11 further comprising:
a bore extending through the interior portion of the housing from the first aperture and curving upward to the second aperture; and
said electrical power cord extends through the bore.

* * * * *